United States Patent
Masuda et al.

(10) Patent No.: US 8,097,479 B2
(45) Date of Patent: *Jan. 17, 2012

(54) ANTI-REFLECTIVE FILM AND PRODUCTION METHOD THEREOF, AND STAMPER FOR PRODUCING ANTI-REFLECTIVE FILM AND PRODUCTION METHOD THEREOF

(75) Inventors: Hideki Masuda, Tokyo (JP); Kenji Yasui, Matsuyama (JP); Yasushi Kawamoto, Yokohama (JP)

(73) Assignee: Kanagawa Academy of Science and Technology, Kawasaki-shi, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/732,934

(22) Filed: Mar. 26, 2010

(65) Prior Publication Data

US 2010/0177392 A1  Jul. 15, 2010

Related U.S. Application Data

(62) Division of application No. 11/452,237, filed on Jun. 14, 2006, now Pat. No. 7,713,768.

(51) Int. Cl.
*H01L 21/00* (2006.01)
*H01L 33/00* (2010.01)

(52) U.S. Cl. .................. 438/29; 438/65; 257/98

(58) Field of Classification Search ............. 438/29, 438/65, 69, 71, 72; 257/98
See application file for complete search history.

(56) References Cited

U.S. PATENT DOCUMENTS

| | | | |
|---|---|---|---|
| 6,139,713 A | 10/2000 | Masuda et al. | |
| 7,066,234 B2 | 6/2006 | Sawitowski | |
| 7,129,183 B2 | 10/2006 | Mori et al. | |
| 7,268,948 B2 | 9/2007 | Matsuo et al. | |
| 7,713,768 B2 * | 5/2010 | Masuda et al. | 438/29 |
| 7,835,080 B2 | 11/2010 | Taguchi et al. | |
| 2004/0038149 A1 | 2/2004 | Murakami et al. | |
| 2007/0235342 A1 | 10/2007 | Matsuo et al. | |

FOREIGN PATENT DOCUMENTS

| | | |
|---|---|---|
| JP | H11-291657 A | 10/1999 |
| JP | 2002-066337 A | 3/2001 |
| JP | 2001-207288 A | 7/2001 |
| JP | 2001-213700 A | 8/2001 |
| JP | 2002-285382 A | 10/2002 |
| JP | 2003-043203 A | 2/2003 |

(Continued)

OTHER PUBLICATIONS

Notification, dated Jul. 1, 2008, in JP Appln. 2003-392119.

(Continued)

*Primary Examiner* — Kevin M Picardat
(74) *Attorney, Agent, or Firm* — Fitch, Even, Tabin & Flannery

(57) ABSTRACT

In this method for producing an anti-reflective film, pores are formed on a surface of a polymer molding material to continuously change a refractive index and then reduce reflectance, in which anodic oxidized porous alumina, in which pores having a tapered shape and whose pore diameter continuously changes, are formed by repeating anodic oxidation at about the same formation voltage and pore diameter enlargement treatment, is used as a mold, or a stamper, which is produced by using the anodic oxidized porous aluminum as a mold, is used as a mold.

7 Claims, 6 Drawing Sheets

FOREIGN PATENT DOCUMENTS

| WO | WO 01/83198 A1 | 11/2001 |
| WO | WO 2006/059686 A1 | 6/2006 |

OTHER PUBLICATIONS

Office Action (and translation), dated Sep. 18, 2009, issued in JP Appln. 2003-392119.

Kanamori et al., Applied Physics Letters, vol. 78, No. 2, pp. 142-143 (2001).

Masuda et al., Chemistry Letters, pp. 1150-1151 (2002).

Hoyer et al., Thin Solid Films, 286, pp. 88-91 (1996).

Masuda et al., "Fabrication of polymer anti-refractive structure using anodic porous alumina as a template," Extended Abstracts, 52nd Spring Meeting, 2005, The Japan Society of Applied Physics and Related Society, No. 3, p. 1112, 30p-ZR-9.

Yanagishita et al., "Fabrication of metal mold based on high-regularity porous alumina and application for nano imprint," The Surface Science Society of Japan, 25th Annual Meeting of the Surface Science Society, Summary, 2005, p. 152, 3C02.

Japanese Office Action dated Dec. 1, 2009.

Japanese Office Action dated Dec. 8, 2009.

Masuda et al., Fabrication of highly ordered anodic porous Al membranes (II), Journal of Aluminium Research, Japan, 1995, No. 2, pp. 49-50.

Brandli et al., Automated synthesis and characterization of diverse libraries of macroporous alumina, Electrochemica Acta 47 (2001), pp. 553-557.

Office Action, Mar. 23, 2010, in JP Appln. 2009-210834 (with translation).

Office Action, Mar. 23, 2010, in JP Appln. 2009-210835 (with translation).

* cited by examiner

ANTI-REFLECTIVE FILM AND PRODUCTION METHOD THEREOF, AND STAMPER FOR PRODUCING ANTI-REFLECTIVE FILM AND PRODUCTION METHOD THEREOF

CROSS REFERENCE TO RELATED APPLICATION

This application is a divisional application of U.S. application Ser. No. 11/452,237, filed Jun. 14, 2006, the complete disclosure of which is incorporated herein by reference.

BACKGROUND OF THE INVENTION

1. Field of the Invention

The present invention relates to an anti-reflective layer (anti-reflective film) formed on the surface of a polymer molding material which reduces reflection in the visible light range and a production method thereof, and a stamper for forming the anti-reflective film and a production method thereof.

2. Description of Related Art

Polymer molding materials are widely used in various information equipment display devices. It is necessary to form an anti-reflective layer to inhibit reflected light to ensure satisfactory visibility. Multilayer films composed of dielectrics having different refractive indices are normally used as anti-reflective layers. Since vacuum deposition or sputtering is used to form the dielectric layer, there was the problem of requiring expensive devices and considerable production time to form the reflective layer.

On the other hand, a method for reducing reflectance is known in which a projections are imparted to the surface of the polymer molding material to form a layer in which reflectance continuously changes. A stamper having an arrangement of depressions corresponding to the projections is normally provided to impart the shape of the projections to the polymer molding material, and a method for processing the polymer molding material is employed using the stamper.

The depressions formed in the stamper for forming projections on the surface of the polymer molding material have an extremely low period as compared with the wavelength of light, and are required to have a depth of about ¼ the wavelength to adequately attenuate reflectance in the visible light range (see, for example, Japanese Unexamined Patent Application, First Publication No. 2003-43203). At this time, the depressions are required to have a tapered shape since they are required to cause reflectance to continuously change.

Electron beam lithography, or techniques combining patterning by optical exposure and semiconductor single crystal anisotropic etching exemplified by Si, are typically used to form an arrangement of depressions which satisfy such conditions. This involves forming openings at a desired period using various types of lithography, followed by forming tapered holes by wet or dry etching. Although electron beam lithography enables patterning at an adequate fine period for the lithography method, it requires considerable time and expensive equipment for processing. Although optical exposure methods employ a method in which a pattern is formed by utilizing the interference of laser light, it is difficult to form a structure having an adequate fine period.

A method has been proposed for forming a fine pattern which uses anodic oxidized porous alumina having a regular pore arrangement (see, for example, Kanamori et al., Appl. Phys. Lett., Vol. 78, No. 2, p. 142 (2001)). In this method, depressions are formed in an Si substrate by carrying out reactive ion etching using the anodic oxidized porous alumina having a regular pore arrangement as a mask. Although a technique for forming an arrangement of projections in a polymer can be easily surmised by using the similar arrangement of depressions formed in this manner as a mold, it is difficult to form a tapered shape required for the formation of a non-reflective layer with this method.

In addition, although a method has been proposed for carrying out etching on a porous structure of anodic oxidized porous alumina and producing a stamper based thereon (see, for example, Japanese Unexamined Patent Application, First Publication No. 2003-43203), since the shape of the pores of the anodic oxidized porous alumina is cylindrical, it is difficult to simply form projections having the controlled taper shape required for an anti-reflective film in a polymer molding material based thereon.

SUMMARY OF THE INVENTION

As described above, in methods using lithography, it is difficult to inexpensively produce a stamper which is able to process a large surface area, while also being difficult to control the taper shape. In addition, even in techniques using anodic oxidized porous alumina, there was the problem of it being difficult to form the optimum tapered shape required for the formation of a non-reflective layer.

Therefore, in order to solve the aforementioned problems of the prior art, an object of the present invention is to provide a method for producing an anti-reflective film which is able to form a desired anti-reflective film on the surface of a polymer molding material by using anodic oxidized porous alumina as a mold, an anti-reflective film formed by the method, a stamper which is able to efficiently form the anti-reflective film, and a method for producing the stamper.

In order to solve the aforementioned problems, the present invention allows the production of a non-reflective polymer film by repeating anodic oxidation at about the same formation voltage and pore diameter enlargement treatment, and using anodic oxidized porous alumina, to which a tapered shape has been imparted in which pore diameter continuously changes, as a mold. Namely, a method for producing an anti-reflective film of the present invention comprises forming unevenness on the surface of a polymer molding material to continuously change a refractive index and then reduce reflectance; wherein the anodic oxidized porous alumina, in which pores having a tapered shape and whose pore diameter continuously changes, are formed by repeating anodic oxidation at about the same formation voltage and pore diameter enlargement treatment, is used as a mold, or a stamper, which is produced by using the anodic oxidized porous aluminum as a mold, is used as a mold.

In this method for producing an anti-reflective film, the production of an even more optimum non-reflective film can be realized by using the anodic oxidized porous alumina having a pore period of 50 to 600 nm and a pore depth of 100 nm or more as a mold.

In addition, the use of the anodic oxidized porous alumina produced by anodic oxidation at about the same formation voltage and pore diameter enlargement treatment, after having carried out anodic oxidation for an extended period of time at a constant voltage followed by temporarily removing an oxide film, makes it possible to use as a mold the anodic oxidized porous alumina having highly orderly arrangement of pores.

The anodic oxidized porous alumina produced at a formation voltage of 30 to 60 V using, for example, oxalic acid for an electrolyte may be used for the anodic oxidized porous alumina used in the present invention, while the anodic oxidized porous alumina produced at a formation voltage of 20 to 30 V using sulfuric acid for the electrolyte may also be used. Furthermore, the anodic oxidized porous alumina produced at a formation voltage of 180 to 210 V using phosphoric acid for the electrolyte may be used. The use of such anodic oxidized porous alumina makes it possible to use an arrangement of depressions having higher regularity as a mold.

Moreover, in the production of the anodic oxidized porous alumina, fine depressions are formed in the surface of aluminum prior to anodic oxidation, and these may be used as pore formation points during anodic oxidation. As a result, an arrangement of depressions having an arbitrary arrangement can be used as a mold.

An anti-reflective film of the present invention is produced according to such a method, and has superior anti-reflection performance due to surface unevenness formed in a desired shape. In particular, this anti-reflective film is able to demonstrate the target level of anti-reflection performance in various applications as a result of being formed on the surface of a light-transmitting polymer molding material.

A method for producing a stamper for producing an anti-reflective film of the present invention, the anti-reflective film comprising forming unevenness on the surface of a polymer molding material to continuously change a refractive index and then reduce reflectance; wherein anodic oxidized porous alumina, in which pores having a tapered shape and whose pore diameter continuously changes, are formed by repeating anodic oxidation at about the same formation voltage and pore diameter enlargement treatment, is used as a mold.

The stamper for producing an anti-reflective film as claimed in the present invention is produced by a method as described above.

According to the present invention, a mold can be formed based on anodic oxidized porous alumina, for which taper shape has been controlled, more easily than methods of the prior art. As a result, the present invention enables an anti-reflective film which reduces reflection in the visible light range, a production method thereof, a stamper for forming an anti-reflection layer, and a method for producing the stamper.

DETAILED DESCRIPTION OF THE INVENTION

The following provides an explanation of preferred embodiments of the present invention with reference to the drawings.

Figure 1:
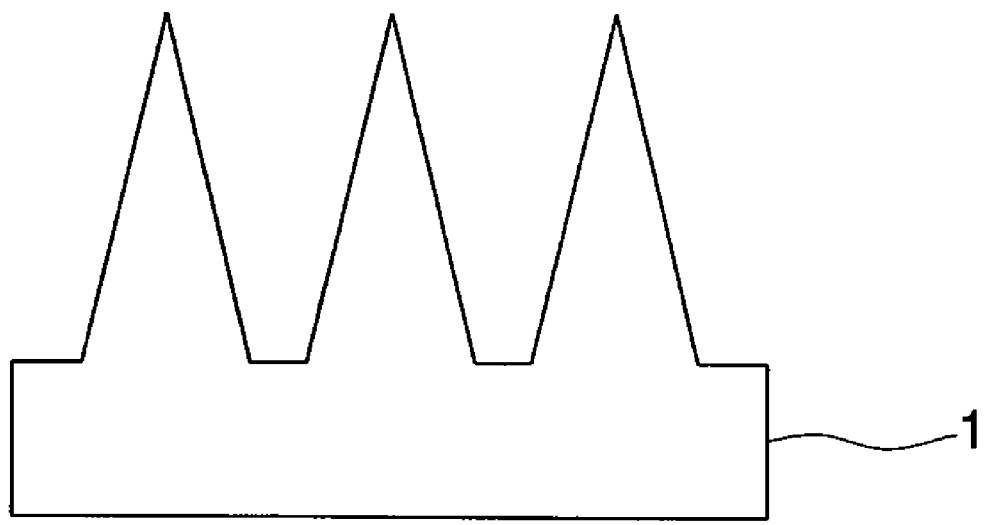
FIG. 1 is a schematic cross-sectional view of an example of a polymer non-reflective film on which is formed an arrangement of surface projections.

FIG. 1 shows an example of the structure of an anti-reflective film (non-reflective film) comprising a polymer formed in the present invention. As a result of having an arrangement of tapered projections on the surface of polymer molding material 1, namely as a result of having surface unevenness, the refractive index continuously changes, thereby making it possible to reduce reflectance.

Figure 2:
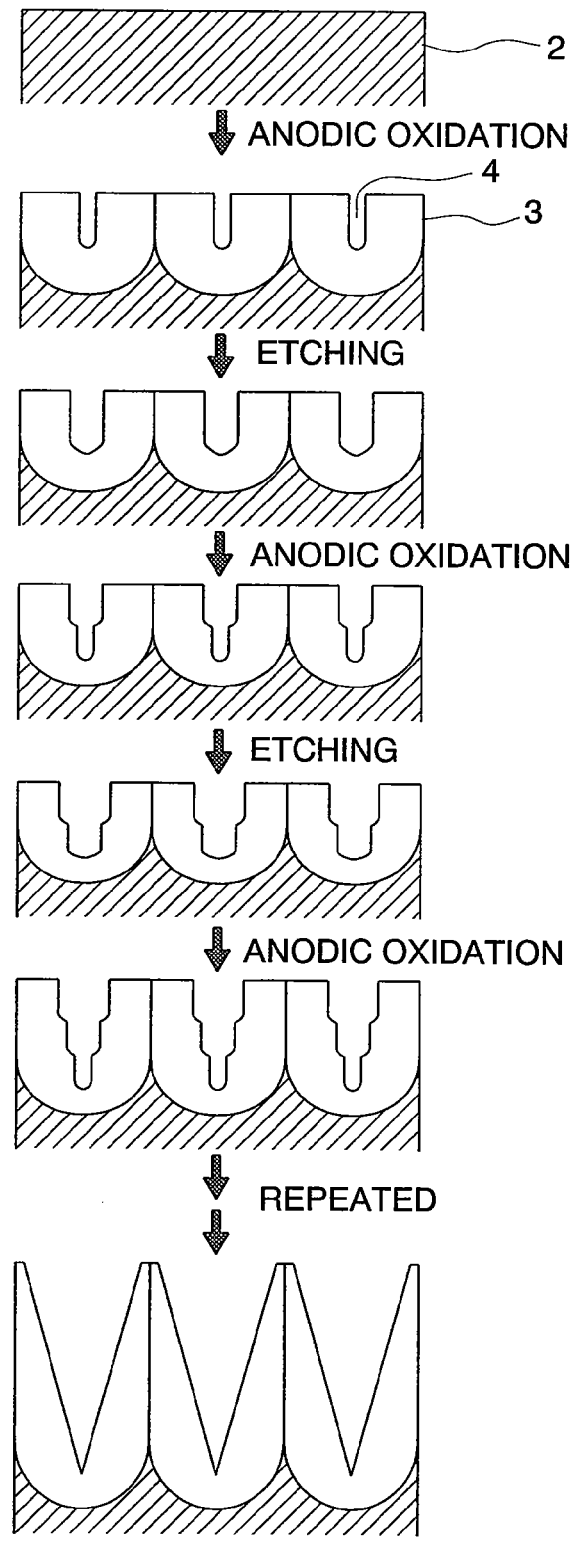
FIG. 2 is a series of drawings showing the process for forming anodic oxidized porous alumina having tapered pores by repeating anodic oxidation and etching in the present invention.

FIG. 2 shows a method for producing anodic oxidized porous alumina having a tapered shape of the present invention. Although anodic oxidized porous alumina 3 is formed on the surface of an aluminum substrate 2, the shape of pores 4 of anodic oxidized porous alumina 3 is cylindrical, thus making it difficult to use as a mold for forming a non-reflective film if left in this state. In the present invention, by repeating anodic oxidation at about the same formation voltage and pore diameter enlargement treatment by etching, production of the anodic oxidized porous alumina having pores of a desired tapered shape is realized. After carrying out anodic oxidation for a predetermined amount of time to form pores having a desired depth, pore diameter enlargement treatment is carried out by immersing in a suitable acidic solution. Subsequently, by carrying out anodic oxidation at a formation voltage approximately equal to that of the anodic oxidation previously carried out, pores having a smaller diameter as compared with the first stage are formed. At this time, unless anodic oxidation is carried out at a formation voltage approximately equal to the anodic oxidation previously carried out, the pores are not formed perpendicular to the direction of film thickness of an anodic oxidized film and plural pores are formed from the pores formed by the previous anodic oxidation, and, as a result, pores having a tapered shape are unable to be formed. Subsequently, when anodic oxidation and pore diameter enlargement treatment are repeated, as a result of carrying out anodic oxidation at about the same formation voltage as the previous anodic oxidation, the pores to be formed are formed perpendicular to the direction of film thickness, thereby making it possible to form pores having a regular tapered shape. The about the same formation voltage does not necessarily need to have quite the same voltage value, while the formation voltage will be about the same formation voltage if a voltage value is within the limits of the deflection width of the voltage supplied.

By repeating this procedure, the anodic oxidized porous alumina having a tapered shape can be obtained. The number of times the procedure is repeated is preferably two or more, more preferably 3 or more, and most preferably 5 or more. Increasing the number of times the procedure is repeated makes it possible to obtain a smoother tapered shape. Pores having various tapered shapes can be formed by adjusting the duration of anodic oxidation and the duration of pore diameter enlargement treatment, thereby making it possible to design the optimum change in refractive index according to the period and pore depth.

In the present invention, oxalic acid, sulfuric acid, phosphoric acid, and the like can be used for the electrolyte of anodic oxidation. Among these, oxalic acid and sulfuric acid are preferable for obtaining a pore period of 50 to 400 nm to be able to prevent reflection in the visible light range.

In the case of using oxalic acid for the electrolyte, the concentration of the electrolyte is preferably 0.7 M or less. If the concentration is higher than 0.7 M, the current value becomes excessively high which may result in roughening of the surface. On the other hand, when the concentration is too low, the speed of anodic oxidation decrease, so the concentration of the electrolyte is preferably 0.01 to 0.6 M.

The temperature of the electrolyte is preferably 60° C. or lower, and more preferably 45° C. or lower. If the temperature of the electrolyte is higher than 60° C., the phenomenon referred to as "scorching" occurs, which may damage the structure or melt the surface, and cause a disturbance in the regularity. On the other hand, when the temperature of the electrolyte is too low, the speed of anodic oxidation decreases, so the temperature of the electrolyte is preferably 10° C. or higher.

In addition, porous alumina having highly regular pores having a period of about 100 nm can be obtained by carrying out anodic oxidation when the formation voltage is 30 to 60 V, preferably 35 to 45 V, and more preferably 39 to 41 V. If the formation voltage is above or below this range, regularity tends to decrease, and pores having pore diameter and pore period larger than the wavelength of visible light may be obtained.

In the case of using sulfuric acid for the electrolyte, the concentration of the electrolyte is preferably 0.7 M or less. If the concentration is higher than 0.7 M, the current value becomes excessively large, so the surface may become coarsely. On the other hand, when the concentration of the electrolyte is too low, the speed of anodic oxidation decreases, so the concentration of the electrolyte is preferably 0.2 to 0.6 M.

The temperature of the electrolyte is preferably 30° C. or lower, and more preferably 20° C. or lower. If the temperature of the electrolyte is higher than 30° C., the phenomenon referred to as "scorching" occurs, which may damage the structure or melt the surface, and cause a disturbance in the regularity. On the other hand, when the temperature of the electrolyte is too low, the speed of anodic oxidation decreases, so the temperature of the electrolyte is preferably 0° C. or higher.

Highly regular pores having a period of about 63 nm can be obtained by carrying out anodic oxidation when the formation voltage is 20 to 30 V, preferably 23 to 28 V, and more preferably 24 to 26 V. If the formation voltage is above or below this range, regularity tends to decrease, and pores having pore diameter and pore period larger than the wavelength of visible light may be obtained.

In the case of using phosphoric acid for the electrolyte, highly regular pores having a period of about 300 nm can be obtained by carrying out anodic oxidation when the formation voltage is preferably 185 to 210V, more preferably 190 to 200 V, and further more preferably 194 to 196 V.

Figure 3:
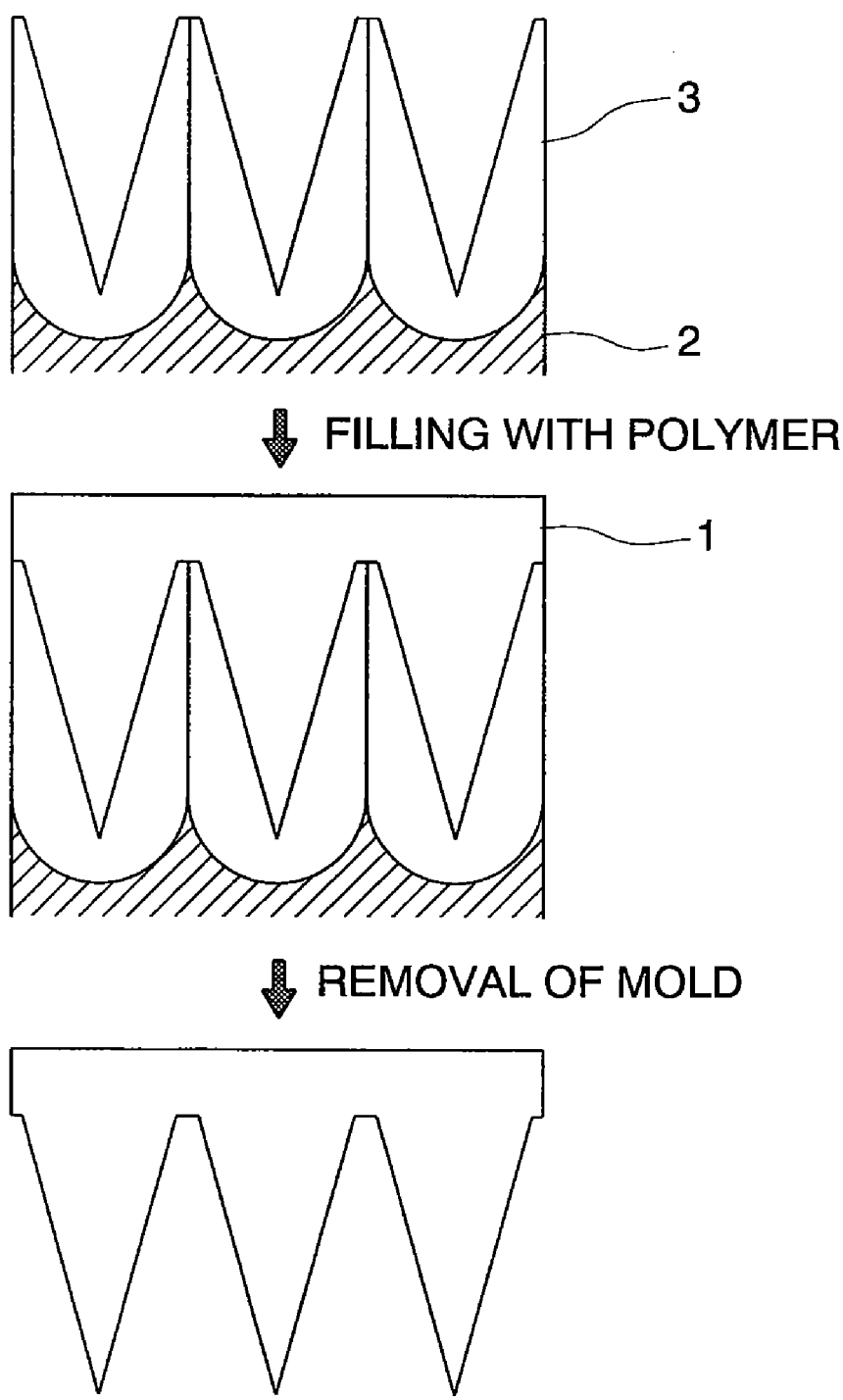
FIG. 3 is a series of drawings showing the process for forming a polymer non-reflective film having a tapered shape by using anodic oxidized porous alumina having tapered pores as a mold.

A non-reflective structure having projections on the surface thereof can be obtained by using the anodic oxidized porous alumina having a tapered shape formed in this manner as a mold, transferring the structure to polymer molding material 1 (by, for example, transferring by filling a polymer into a mold) as shown in FIG. 3, and removing the mold. A polymer molding material having satisfactory light transmissivity and processability can be used for polymer molding material 1, and typical examples include acrylic resins, polycarbonate resins, polystyrene resins, and the like in the form of a film, sheet, or fused molding. In addition, transfer to the polymer can be carried out by a method consisting of filling a monomer followed by polymerization or a method consisting of casting a polymer dissolved in a suitable solvent, while transfer can also be achieved by pressing a polymer film, which has been plasticized by heating or the addition of solvent, into a mold.

Figure 4:
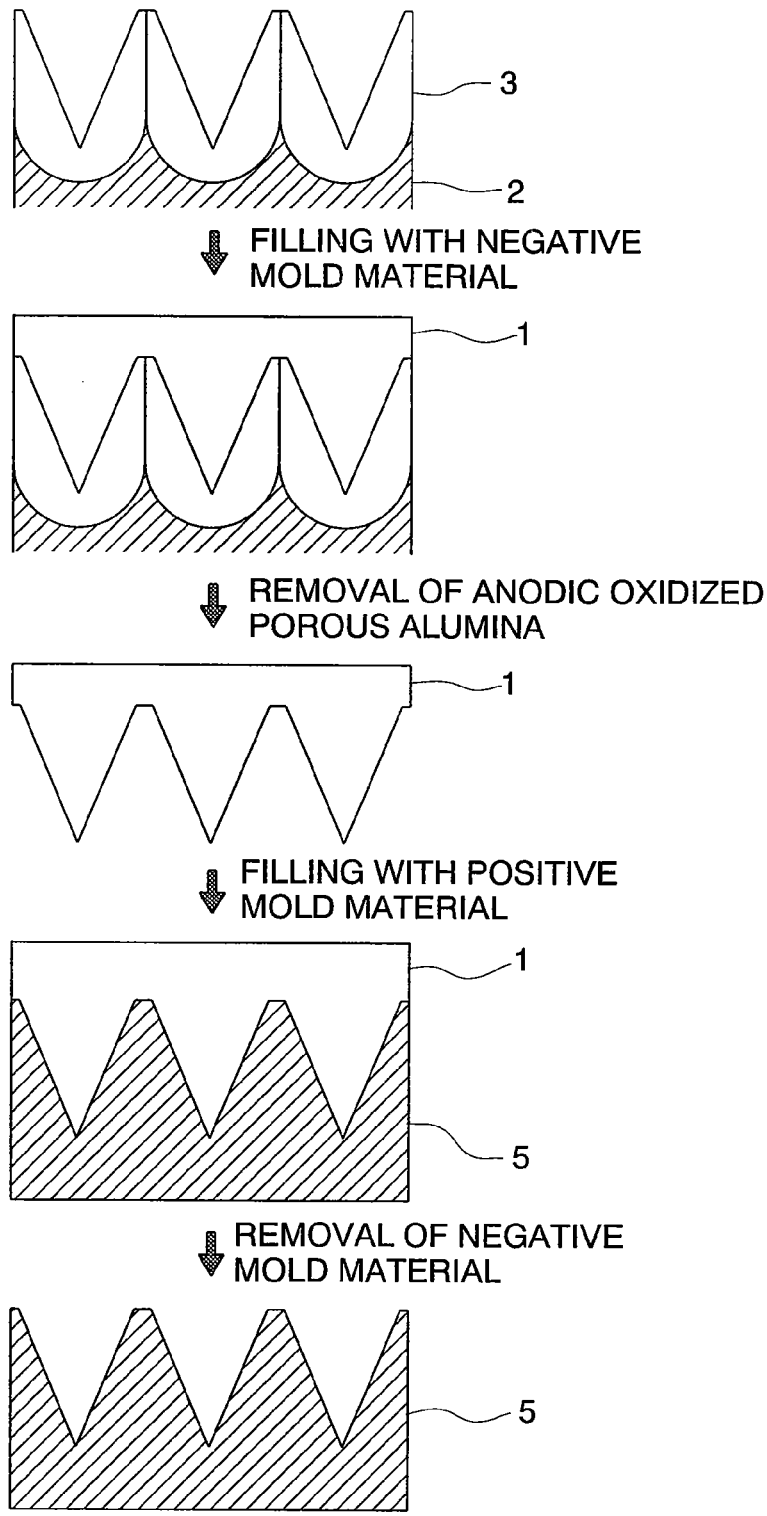
FIG. 4 is a series of drawings showing the process for forming a stamper made of metal by using anodic oxidized porous alumina having tapered pores as a mold.

In the case of using the anodic oxidized porous alumina having tapered pores for the mold, in addition to a method which uses the anodic oxidized porous alumina directly, a novel mold of the same shape, namely a stamper for producing an anti-reflective film, can be obtained from a material such as metal by using the anodic oxidized porous alumina as a mold as shown in FIG. 4, and this is effective for improving durability, wear resistance, or separation properties. In the example shown in FIG. 4, after transferring a structure to a polymer 1 in the form of a negative mold material by using anodic oxidized porous alumina 3 as a mold, anodic oxidized porous alumina 3 is removed, and a metal and the like used as a positive mold material is filled into the negative mold produced above followed by removing the negative mold to obtain a stamper made of metal and the like.

Figure 5:
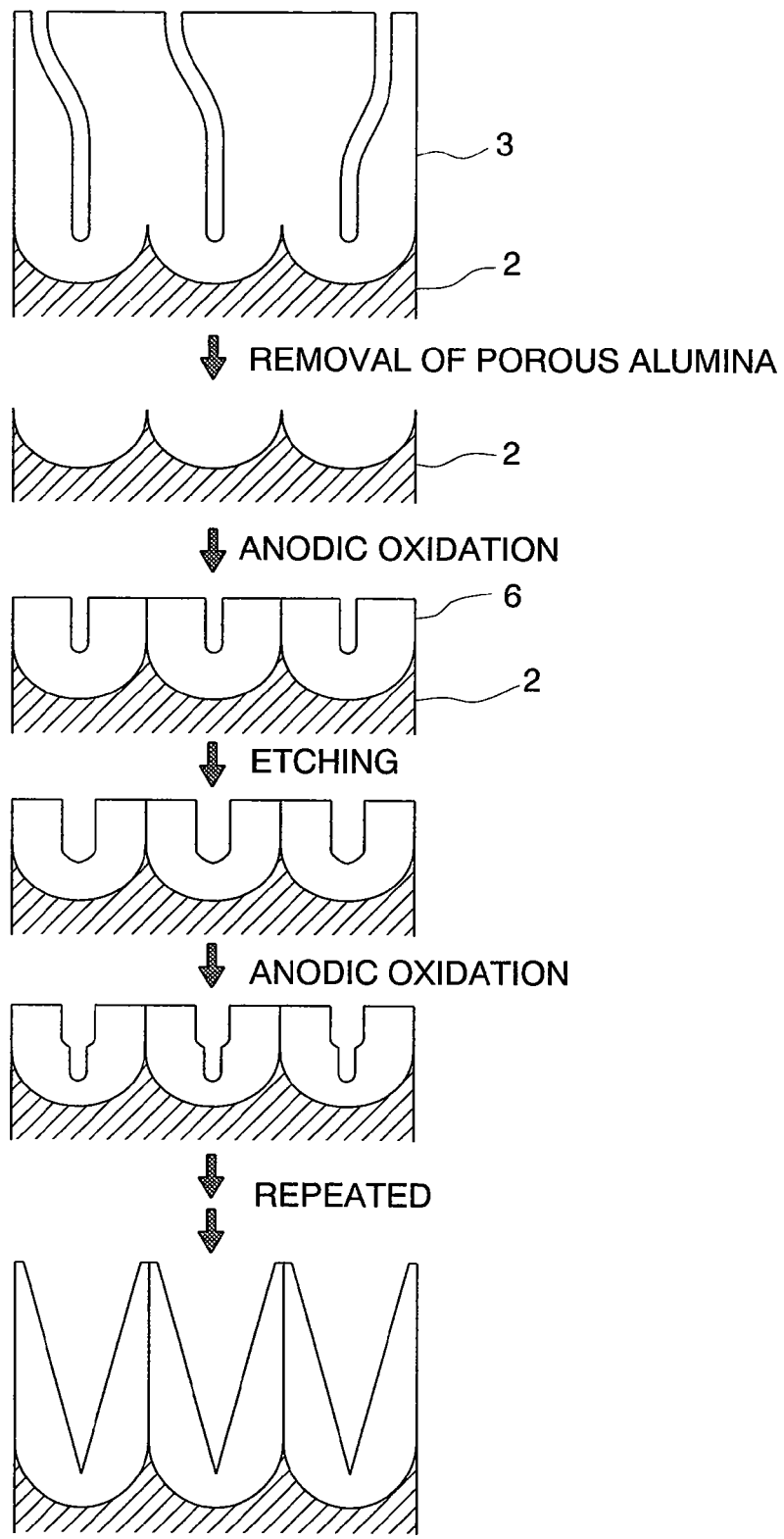
FIG. 5 is a series of drawings showing the process for producing anodic oxidized porous alumina having highly regular tapered pores by temporarily dissolving and removing an oxide layer after carrying out anodic oxidation, and then repeating anodic oxidation.

In the present invention, as shown in FIG. 5, prior to forming the tapered pores, after preliminarily carrying out anodic oxidation for a comparatively long period of time to make the arrangement of pores of the anodic oxidized porous alumina layer regular, by then removing the alumina layer, a regular arrangement of depressions is obtained corresponding to the bottoms of the porous alumina (referred to as a barrier layer) on the surface of aluminum. By then again repeating anodic oxidation at the same voltage as the long-duration anodic oxidation and pore diameter enlargement treatment, tapered porous alumina is formed in which the pores thereof are regularly arranged starting at the uppermost surface. In other words, a repeat anodic oxidation layer 6 is formed in which pores having a preferable tapered shape are arranged with higher regularity. In general, the anodic oxidized porous alumina has low regularity of the pore arrangement in the uppermost surface portion thereof initially formed during anodic oxidation, and a non-reflective film formed based on such anodic oxidized porous alumina has increased light scattering resulting in the possibility of it being difficult to use this film as a satisfactory non-reflective film. However, on the basis of the aforementioned technique, the anodic oxidized porous alumina can be obtained in which the pores are arranged with a high degree of regularity, thereby contributing to the formation of a satisfactory non-reflective film. At this time, the anodic oxidized porous alumina having a high degree of regularity is known to be able to be obtained at a formation voltage of 30 to 60 V, and more preferably 40 V, in the case of using oxalic acid for the electrolyte, or at a formation voltage of 25 to 30 V in the case of using sulfuric acid for the electrolyte (see, for example, Masuda, Applied Physics, Vol. 69, No. 5, p. 558 (2000)). In addition, there are no particular limitations on the method for removing the alumina layer, and, for example, methods removing the alumina by dissolving the alumina in a solution which selectively dissolves the alumina without dissolving the aluminum may be used. Among the methods, a method immersing in a mixture of chromic acid and phosphoric acid may be used. The anodic oxidized porous alumina formed in this manner and having a highly regular pore arrangement can be effectively used directly or to produce a mold made of metal and the like.

Figure 6:
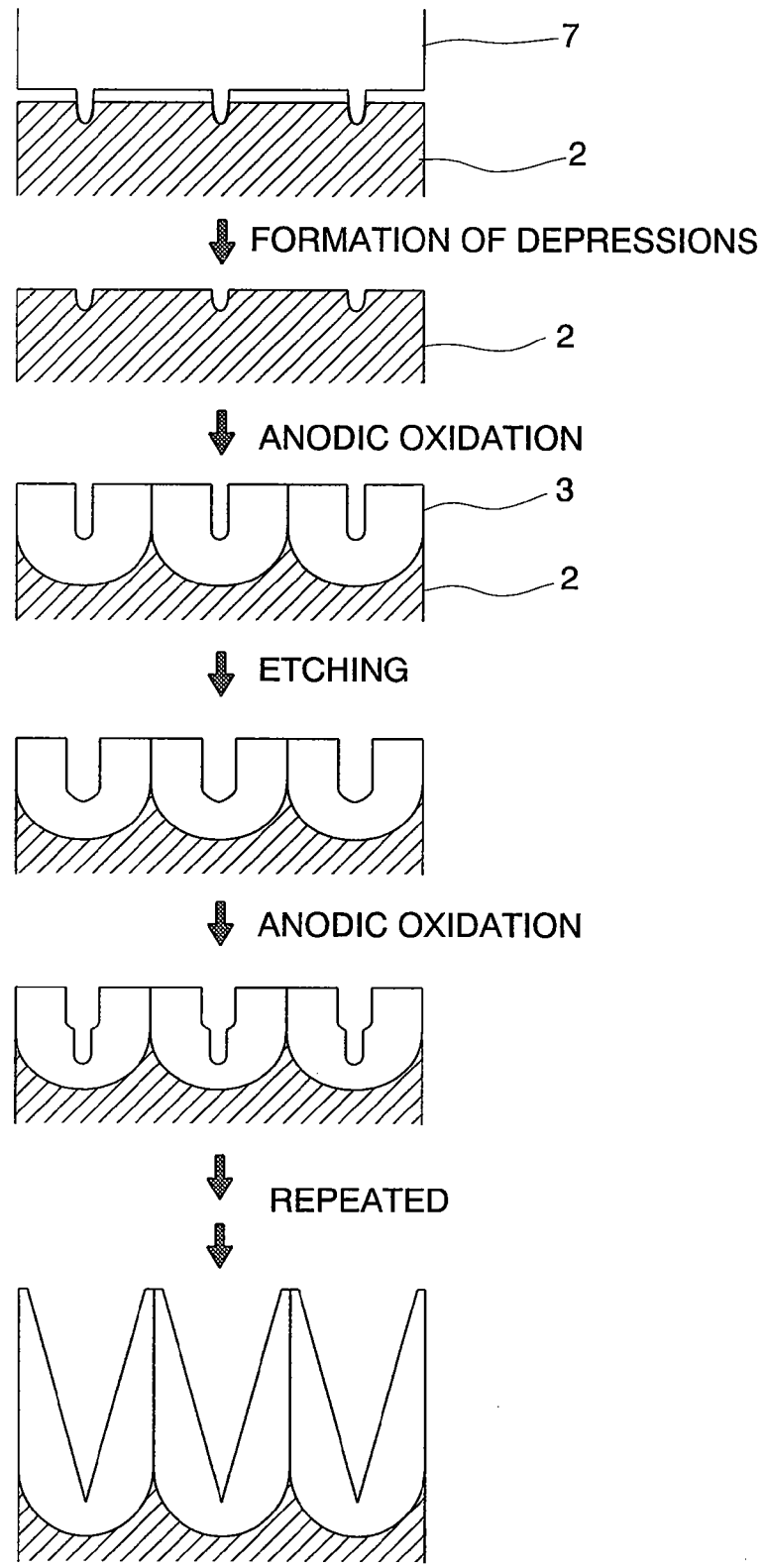
FIG. 6 is a series of drawings showing the process for producing anodic oxidized porous alumina having tapered pores for which pore arrangement has been controlled by using a mold having a regular arrangement of projections to form an arrangement of depressions in an aluminum surface followed by anodic oxidation.

In the present invention, as shown in FIG. 6, after forming an arrangement of depressions on the surface of aluminum 2 by using a mold 7 having a desired arrangement of projections, the anodic oxidized porous alumina having tapered pores in an arrangement corresponding to the projection arrangement of the mold can be obtained by repeating anodic oxidation, at a formation voltage conforming to the depression interval, and pore diameter enlargement treatment, with the depressions serving as starting points of pore formation. According to this method, the anodic oxidized porous alumina having an arbitrary period and arrangement can be formed, thereby contributing to the obtaining of a satisfactory non-reflective film. This method not only contributes to the obtaining of porous alumina having a highly regular pore arrangement, but also contributes to inhibition of the generation of color interference and so forth based on optical interference which presents a problem during use as a display material. The anodic oxidized porous alumina having a highly regular pore arrangement formed in this manner can effectively used directly or for the production of a metal or other mold.

The following provides a more detailed explanation of the present invention based on examples thereof.

Example 1

Anodic oxidation was carried out on an aluminum sheet of 99.99% purity for 50 seconds at a temperature of an electrolyte of 17° C., formation voltage of 40 V, and using 0.3 M oxalic acid for the electrolyte. Subsequently, pore diameter enlargement treatment was carried out by immersing for 5 minutes in 2% by weight phosphoric acid at 30° C. This procedure was repeated five times to obtain anodic oxidized porous alumina having tapered pores having a period of 100 nm, pore diameter opening of 80 nm, bottom of 25 nm, and pore depth of 300 nm.

After filling the pores with methyl methacrylate monomer containing benzoyl peroxide of 5% by weight as a polymerization initiator, the monomer was polymerized by irradiating with ultraviolet light. Following polymerization, the polymer layer was separated from the mold to obtain polymethyl methacrylate resin having an arrangement of projections on the surface thereof. As a result of measuring the reflectance of the resulting polymer film, reflectance was confirmed to have decreased.

Example 2

Anodic oxidation was carried out on an aluminum sheet similar to that of Example 1 for 6 seconds at a temperature of an electrolyte of 17° C., formation voltage of 25 V and using 0.3 M sulfuric acid for the electrolyte. Subsequently, pore diameter enlargement treatment was carried out by immersing for 3 minutes in 10% by weight phosphoric acid at 30° C. After repeating this procedure five times, anodic oxidation was carried out for an additional 6 seconds to obtain anodic oxidized porous alumina having tapered pores having a period of 63 nm, pore diameter opening of 55 nm, bottom of 20 nm, and pore depth of 170 nm.

Subsequently, reflectance was confirmed to have decreased as a result of transferring the structure to a polymethyl methacrylate resin in the same manner as Example 1.

Example 3

After carrying out anodic oxidation on an aluminum sheet in the same manner as Example 1 for 2 hours at a temperature of an electrolyte of 17° C., formation voltage of 40 V and using 0.3 M oxalic acid for the electrolyte, the porous alumina layer was selectively dissolved and removed by a mixed solution of phosphoric acid and chromic acid. Subsequently, anodic oxidation and pore diameter enlargement treatment were repeated under the same conditions as Example 1 to obtain anodic oxidized porous alumina having tapered pores in which the pores were arranged with high regularity. Subsequently, reflectance was confirmed to have decreased as a result of transferring the structure to a polymethyl methacrylate resin using the same procedure as Example 1.

Example 4

Reflectance was confirmed to have decreased by forming anodic oxidized porous alumina having tapered pores using the same method as Example 1, followed by transferring to a polycarbonate resin using the porous alumina as a mold.

Example 5

After forming anodic oxidized porous alumina having tapered pores using the same method as Example 1, polymethyl methacrylate was filled into the anodic oxidized porous alumina to obtain a negative mold of the porous alumina. Subsequently, a treatment was carried out on the surface of the polymethyl methacrylate to provide electrical conductivity followed by filling with nickel by plating. The polymethacrylate negative mold was then dissolved and removed to obtain a nickel positive mold having the same structure as the anodic oxidized porous alumina serving as the master mold. The nickel positive mold was then pressed onto heated polymethyl methacrylate to obtain a low-reflective film having an arrangement of projections on the surface thereof.

Example 6

A mold having projections arranged at a period of 200 nm was pressed onto an aluminum sheet to obtain an arrangement of depressions corresponding to the projections in the surface of the aluminum sheet. Subsequently, anodic oxidation, at a formation voltage of 80 V and using 0.05 M oxalic acid for the electrolyte, and pore diameter enlargement treatment, were repeated five times to obtain the anodic oxidized porous alumina having tapered pores having a period of 200 nm, pore opening of 160 nm, bottom of 50 nm and pore depth of 500 nm. Subsequently, reflectance was confirmed to have decreased as a result of transferring the structure to polymethyl methacrylate resin using the same procedure as Example 1.

The present invention can be applied to all applications requiring the formation of an anti-reflective film, and is particularly suitable for various information equipment display devices requiring improved visibility.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A mold composed of anodic oxidized porous alumina, comprising: a plurality of pores having a diameter decreases stepwise along a depth direction thereof, and formed by repeating anodic oxidation and pore diameter enlargement treatment.

2. The mold composed of anodic oxidized porous alumina according to claim 1, wherein the anodic oxidation is carried out with oxalic acid as an electrolyte and at a formation voltage of 30 to 60 V.

3. The mold composed of anodic oxidized porous alumina according to claim 1, wherein the anodic oxidation is carried out with sulfuric acid as an electrolyte and at a formation voltage of 20 to 30 V.

4. The mold composed of anodic oxidized porous alumina according to claim 1, wherein the mold has a pore period of 50 to 600 nm and a pore depth of 100 nm or more.

5. The mold composed of anodic oxidized porous alumina according to claim 1, wherein repeating the anodic oxidation and the pore diameter enlargement treatment are terminated with the anodic oxidation.

6. A method for producing an anti-reflective film having a refractive index continuously changed and then reducing reflectance comprising:

forming unevenness on a surface of a polymer molding material by molding shape with the mold according to claim 1.

7. An anti-reflective film having a refractive index continuously changed and then reducing reflectance produced with the mold according to claim 1.

* * * * *